UNITED STATES PATENT OFFICE.

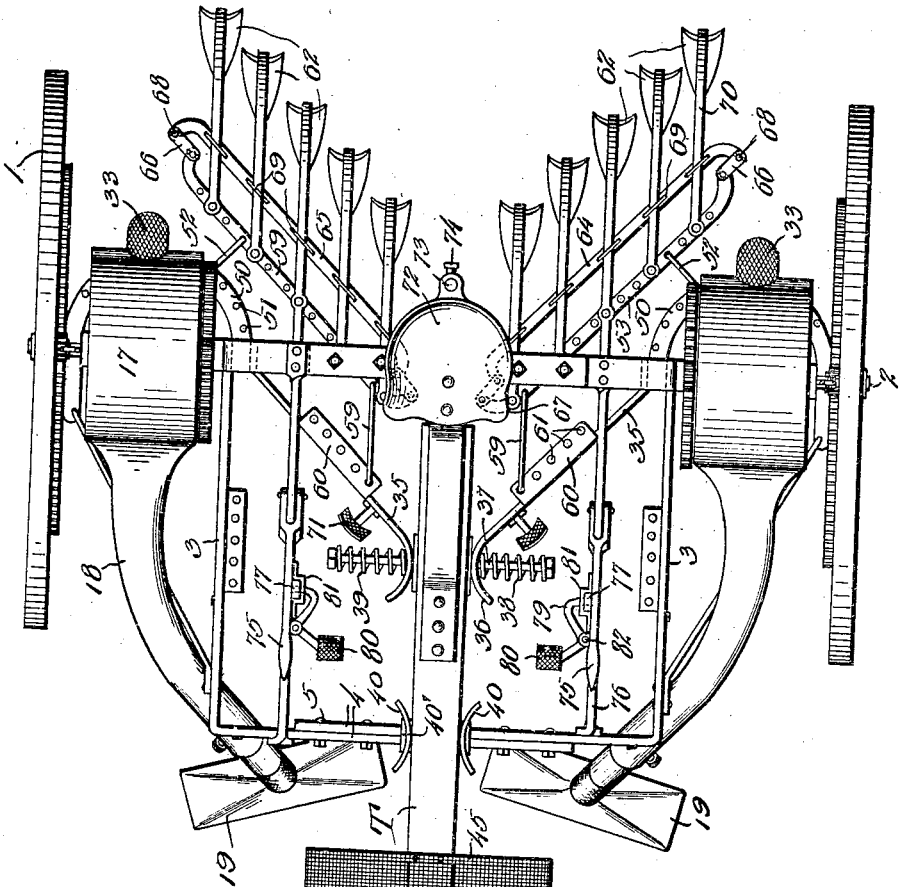

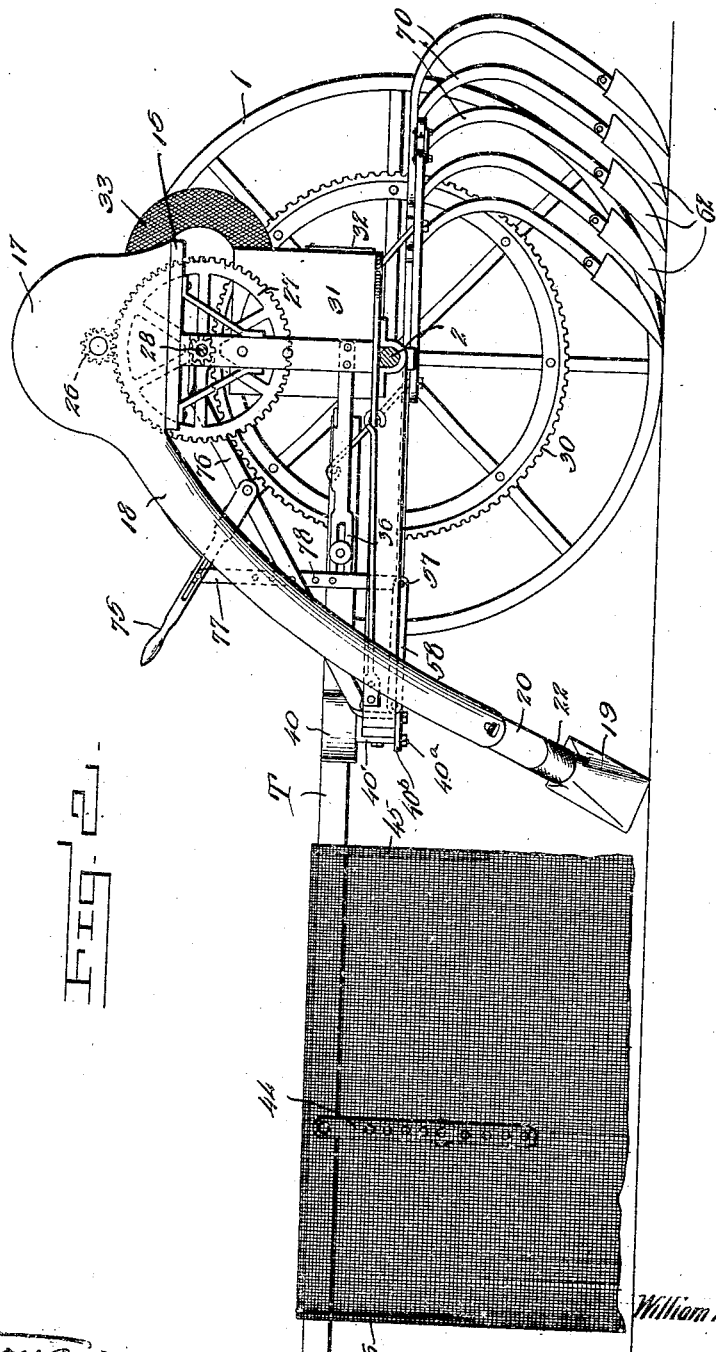

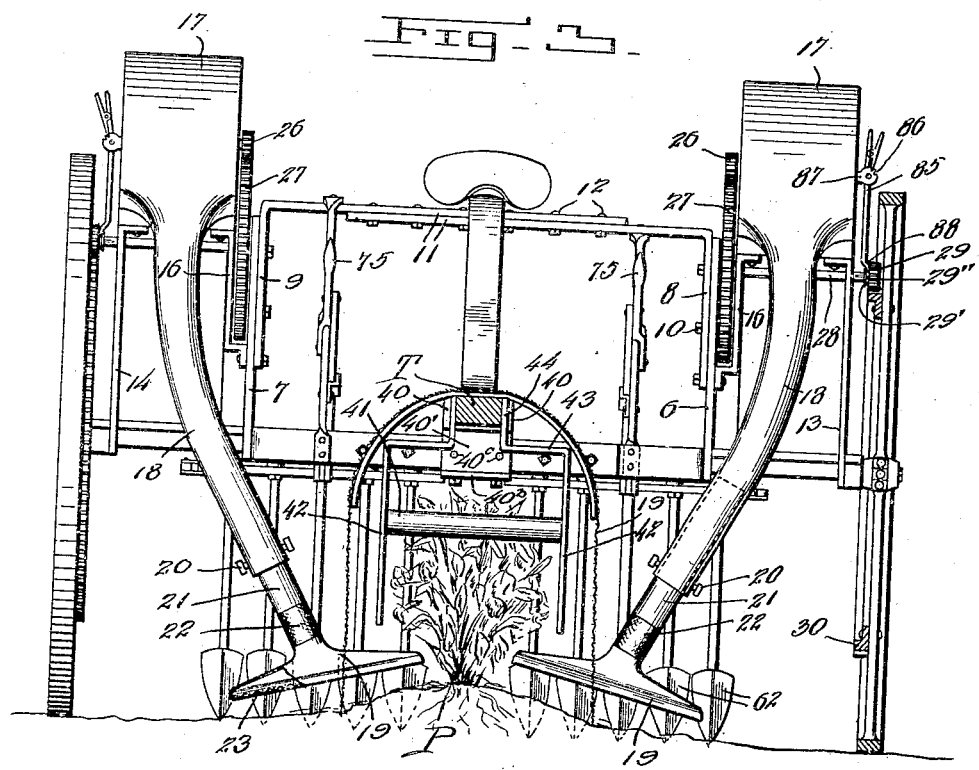
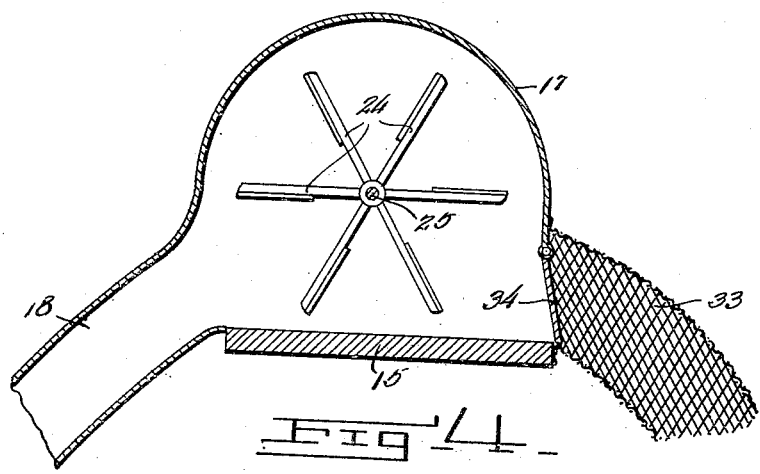

WILLIAM A. MILLER, OF BLOUNT COUNTY, ALABAMA.

INSECT-CATCHER.

1,245,258.  Specification of Letters Patent.  Patented Nov. 6, 1917.

Application filed January 23, 1917. Serial No. 143,920.

*To all whom it may concern:*

Be it known that I, WILLIAM A. MILLER, a citizen of the United States, residing in the county of Blount, and State of Alabama, have invented certain new and useful Improvements in Insect-Catchers, of which the following is a specification.

This invention relates to improvements in agricultural implements, and more particularly to a combined insect catching machine and earth-working implement.

The main object of the invention is to provide a simply constructed, strong, efficient machine of this character which, while cultivating the plants will simultaneously knock off and collect any insects thereon and retain them until they can be removed and destroyed.

Another object is to provide a machine of this character in which the insect catching apparatus is operated by the travel of the machine over the ground.

Still another object is to provide a machine of this character which is especially adapted for use in destroying boll weevil and which will not only trap the insects but will collect the eggs and thus prevent the spread of the pests.

Still another object is to equip a machine of this character with means for preventing the insects from crawling out on the machine or draft animals and thereby preventing their escape, said means being also so constructed as to direct the insects dislodged from the plants into the path of the apparatus which collects them and conveys them to a suitable retainer.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 represents a top plan view of a machine constructed in accordance with this invention, Fig. 2 is a side elevation thereof, Fig. 3 is a transverse section taken on the line 3—3 of Fig. 1, Fig. 4 is an enlarged detail vertical section through a fan taken on the line 4—4 of Fig. 3.

In the embodiment illustrated, a wheeled supporting structure is shown comprising a pair of ground wheels 1 connected by a two-part axle 2 on which is supported a vertically and transversely adjustable frame composed of L-shaped members 3 fixed at one end of one arm to the axle 2 and with their other arms 4 extending toward each other and arranged in lapping relation and each provided with a plurality of longitudinally spaced apertures, those in one member registering with those in the other to provide for the reception of the securing bolts 5 whereby these members may be adjusted from and toward each other to vary the position of the parts as will be hereinafter more fully described.

Rising from the axle 2 and fixed at one end thereto are two standards 6 and 7 on which are adjustably mounted two L-shaped bars 8 and 9, said bars having apertures in the arms thereof which are engaged with the uprights 6 and 7 to provide for the reception of bolts 10 so that these members may be adjusted vertically in relation to said uprights. The other arms 11 of said members 8 and 9 are arranged in over-lapping relation and provided with longitudinally spaced apertures to receive bolts 12 which connect them in a manner similar to the front bars of the frame to provide for the expansion and contraction transversely thereof.

Standards 13 and 14 rise from the ends of the axle adjacent the wheels 1 and are fixed thereto, carrying at their upper ends fan supporting platforms 15, the opposite ends of which are supported on standards 16 carried by the uprights 6 and 7, said standards 16 being spaced laterally from the standards 6 and 7 a distance sufficient to provide for the operation between them of gear wheels to be described.

A fan casing 17 is mounted on each of the platforms 15 and may be secured thereto by any suitable means, being preferably removably secured in any suitable manner to afford access to the fan. Extending forwardly from the fan casings 17, one of which is mounted at each side of the machine, are tubes 18 which converge toward their lower ends and carry insect collecting devices 19, which will be presently described in detail.

These devices, as shown in Figs. 1 and 3 are substantially rectangular in form, although obviously they may be of any other desired configuration and are inclined upwardly from one side toward the other to adapt them to conform to the shape of the row or hill over which they are being operated, this inclination being controlled by the adjustment of the devices 19 in the tubes 18 by means of set screws 20 which pass through said tubes and engage sleeves or tubes 21 which are telescopically engaged in the tubes 18 and are carried by the members 19. Flexible sections 22 are arranged between the tubes 21 and the members 19 to adapt them to conform to any unevenness in the rows or to any obstructing objects which may lie in their path. These members 19, which are open on their lower faces have coarse mesh wire shown at 23 arranged thereover, the mesh of which is about one inch, more or less, and is designed to permit the passage therethrough of the insects, squares, or any kind of worms in connection with which the machine is used and yet prevents sticks and such like obstacles from being drawn up through the tubes 18 which would tend to clog and interfere with the operation of the apparatus.

Mounted in the casings 17 are rotary fans 24. Each may be constructed with any desired number of blades which are shown radiating from an axle 25 journaled in the opposite walls of the casing 17. This axle 25 projects at one end through one wall of the casing at the inner side thereof and has a pinion 26 fixed thereto, said pinion meshing with a larger gear 27 carried by the axle 28 revolubly mounted in the uprights 16 and 13 as is clearly shown in Fig. 3. This axle 28 extends through the upright 13 and carries a pinion 29 at its outer end which is positioned to mesh with a large gear 30 fixed to the inner face of the wheel 1. It is understood that these fans and the operating mechanism therefor is the same at both sides of the machine and hence one only will be described in detail.

From this construction it will be obvious that on the passage of the machine over the ground the turning of the wheels 1, will through the gears 30 and pinion 29 operate the larger gears 27 carried by shafts 28 and through pinion 26 rotate the fans 24 at a very high speed, the speed of the fans being controlled by the size of the gears employed.

The pinions 29 are keyed to slide on the shafts 28 and are provided at their inner ends with collars 29', each provided with an annular groove 29". A lever 85 fulcrumed at 86 on a bracket 87 carried by the fan casing has a bifurcated end 88 which enters the groove of the collar 29' and is adapted to reciprocate the pinion 29 to throw it into and out of mesh with the gear 30 at the will of the operator so that the fan actuated by the engagement of said pinion with the gear 30 may be thrown into and out of operation as desired. Should the rapid turning of the fans 24 produce a suction so great as to draw up through the collectors 19 a large quantity of dirt, dust and the like, this may be controlled by elevating the members 19 to position them farther away from the ground, which is accomplished by means of the set screws 20 above described.

Mounted on the frame 3' below the fan casings 17 are two insect retaining members 31 which may be made of any desired shape and mounted in any desired manner in said frame, being removable or not as may be desired. As shown, these retainers are in the form of rectangular boxes having a door 32 opening through the rear thereof to afford access to the box for raking out the insects collected, when it is desired to destroy them. Leading from the fan casings 17 to these retainers 31 are passages 33, each here shown in the form of an open mesh tube preferably constructed of wire. These passages 33 are designed to conduct the insects from the fan casings to the retainers 31 and being made of wire permits any dust which has collected during the gathering of the insects to pass out to the atmosphere during the rotation of the fans. An outwardly opening valve 34 is arranged between each fan casing and the tube 33 at the upper end thereof which will automatically drop on the stoppage of the fan for any purpose and prevent the insects trapped from crawling back through the tube 33 in the fan casing. It is to be understood that these valves 34 which are here shown in the form of doors hinged at their upper ends, must be constructed of some light material which will be opened by the force of the air passing through the fan and yet will be sufficiently heavy to drop by gravity in closed position when the fan ceases to operate.

From the above description it will be obvious that these fans which are located at opposite sides of the machine are totally separate and independent of each other and one or the other thereof may be disconnected without interfering with the operation of the other, although obviously they are intended to operate in unison to suck up the insects from opposite sides of the row of plants being cultivated, said plants being shown at P in Fig. 3 and the inclination of the rows at I. It will also be understood that when the machine is rounding curves that the fan on the inner side of the curve will be thrown out of operation owing to the fact that the wheel at that side will be substantially stationary while the fan on the other side will operate on the turning of the wheel adjacent thereto. When this occurs, the valve 34 of the fan which is thrown out of operation will drop into closed position, shown in Fig. 4 and thereby cut off the return of the insects through the tube 33 to the fan casing. On the starting up of the fan the valve will immediately open owing to the force of the air drawn in therethrough.

A tongue T is connected with the frame by means of braces 35 which are secured at one end to the axle at the opposite sides of the machine, said braces converging toward each other and having their front ends flared and curved as shown at 36, the tongue T being disposed between the convex faces of said ends and connected thereto by a bolt 37 which passes through longitudinal slots in the braces and through the tongue and has mounted thereon coiled springs 38 and 39 disposed between nuts at the ends of the bolt and the outer faces of the curved ends of the brace, as is shown clearly in Fig. 1. The flared curved ends of these braces provide for the turning of the tongue when rounding curves and for the following of the plows or cultivating implements to be described in conformation therewith.

Arcuate guides 40 are arranged at opposite sides of the tongue in advance of its connection with the braces 35. These guides 40 are carried by the front of the frame 3' and are designed to permit the turning of the tongue in a manner soon to be described. These members 40 are mounted on a casing 40' which is substantially inverted U-shaped in cross section and which is designed to straddle the over-lapping ends of the frame members 4 and 5 as is shown clearly in Fig. 2. This casing 40' has threaded studs 40ª depending from its lower face and which are designed to pass through apertures in a plate 40ᵇ which extends under the lapping members 3 and 4 of the frame 3' and which is secured in place by nuts engaging the studs 40ª on the outer face of said plate. This casing is also provided with longitudinally spaced apertures 40ᶜ which are designed to receive the bolts which connect the over-lapping frame members 3 and 4 and thus properly position the casing on said frame to receive the tongue T.

Secured to the tongue at some distance in advance of the frame 3' is a revoluble roller 41 which is adjustably mounted in a frame depending from the tongue. This frame is shown secured to opposite sides of the tongue and comprises vertically disposed laterally spaced bars 42, the free ends of which extend to a point adjacent the ground and they are provided with a plurality of longitudinally spaced apertures which form bearings for journals carried by the ends of the roller 41 so that said roller may be adjusted at any desired height from the ground to adapt it for use in connection with plants of different heights. It is understood that the roller which is adapted to pass over and contact with the tops of the plants for imparting a shaking motion thereto, may be adjusted at any desired height by simply disconnecting the journals thereof from the apertures in which they are placed and positioning them in other apertures of the bars 42 according to the position in which it is desired to locate the roller. These bars are here shown provided with inwardly off-set arms 43 having outwardly and upwardly projecting extensions 44 located parallel with the arms 42 and which are secured to opposite sides of the tongue T (see Fig. 3).

Carried by the tongue T on opposite sides of the roller 41 are two semi-circular guard supporting members 45 and 46, said members being in the form of bands secured midway their ends to the upper face of the tongue by bolting or otherwise. These bands may be spaced apart any suitable or desired distance, and if found necessary more than two may be employed, the object thereof being to support a fabric covering 47 which may be composed of any suitable material such as canvas or the like, and which is in the form of a strip sufficient to cover the space between the bands 45 and 46 and of a length capable of extending over said bands with the edges of the strip resting on the ground at either side of the tongue as is shown clearly in Fig. 3. This guard 47 may be secured to the bands in any suitable or desired manner, and is designed to straddle the plants being cultivated, the side members thereof being spaced from the sides of the plants a sufficient distance to permit the insects knocked from the plants by the roller 41 passing thereover to drop down on either side of the plants between the sides of the guard where they will be gathered up by suction through the members 19 which pass over the ground directly at the rear of said guard.

It is well known that boll weevil is especially injurious to cotton plants owing to the reason that they puncture the squares, which is the technical name for the buds of the plants, and when they puncture these squares they deposit therein their eggs which, if allowed to remain, will mature into insects and thereby form additional pests. Hence, it is one of the main objects in contending with this insect to collect and destroy the eggs as well as the insects themselves, and this is accomplished by collecting the squares in which the eggs are deposited. When these squares have been punctured by the insect they die, and drop off on to the ground, a slight shaking of the plant only being necessary to cause such dropping. The boll weevil itself also, when interfered with or shaken, will fold up and drop off and this apparatus is especially designed to collect these insects and the squares containing their eggs and suck them up through the tubes 18 into the retainers 31 carried by the machine from which they may be removed and destroyed in any desired manner.

Hence it will be seen that by positioning the insect collecting members 19 directly at the rear of the guard 47 that the insects and the squares knocked from the plants by the passage of the roller 41 thereover will be sucked up through the tubes 18 by the suction produced by the fans 24 during the travel of the machine.

To provide for the disconnection of the fans from their operating mechanism, when it is desired for any reason to throw them out of use, the pinions 29 may be thrown out of mesh with the large gear 30 carried by the wheel 1 and this is accomplished by sliding these pinions 29 on the shafts 28 in the manner hereinbefore described.

Furthermore, when it is not desired to use the fans in the operation of the machine, the collecting members 19 may be removed by simply loosening the set screw 20 and disconnecting said members from the tubes 18.

In the use of this insect catching apparatus, when the machine is drawn over the earth with the draft animals walking on opposite sides of the row of plants from which the insects are to be removed, the tongue T will be disposed directly over the plants and the guard 47 will straddle said plants. The roller 41 has been adjusted according to the heights of the plants to be bugged and the collecting members 19 so adjusted that they will be positioned just out of contact with the rows on opposite sides of the plants as is shown clearly in Fig. 3. The machine is then moved forward which causes the roller 41 to agitate the plants during its passage thereover which agitation is sufficient to cause the insects thereon, and the injured squares to drop off and fall to the ground on opposite sides of the plants between them and the sides of the guard 47. The collecting members 19 then following closely behind the guard will suck up the insects, squares or worms and pass them up through the fan casings 17 down through the tubes 33 into the retainers 31, from which latter they may be removed and destroyed when desired or when a sufficient number have collected therein to render this practical.

The earth-working implement constituting a part of this invention may be used as a cultivator, as a plow, or a harrow, according to the wishes of the operator and to provide for such uses, the machine is constructed with semi-circular connecting members 50 which are shown disposed at each side of the machine at the rear of the axle 2, the ends of said members being rigidly secured to the axle with the curved or bowed portion of the members projecting toward the rear of the machine. These members 50 are provided with a plurality of longitudinally spaced apertures 51 to provide for the adjustable connection therewith of links as 52, which are adjustably engaged with plow carrying bars 53 and 54, said bars and the members connected therewith at each side of the machine being exactly the same in construction and hence one only will be described in detail. The brace bars 35 above referred to are secured at their rear ends of the axle adjacent the inner ends of the members 50 and extend obliquely inward from said members toward the tongue T.

Loosely mounted on the lower face of the axle 2 are two plow carrying beams 55 and 56, said beams extending in front of and in the rear of said axle and at their rear being connected with the plow carrying bars 53 and 54, said bars being pivotally mounted on said beams as shown at 57 in Fig. 1. The front portions of these beams are made in two pivotally connected sections, the front section 58 thereof being secured to the front portion 3 of the frame 3′, one of said beams being secured to one member of said frame and one to the other, so that when the members of this frame are adjusted toward or away from each other, the beams 55 and 56 will be correspondingly adjusted.

The inner ends of the bars 53 and 54 are connected with the brace bars 35 by means of links as 59 which are adjustably engaged with said bars at one end and at their other end with plates 60 having a plurality of longitudinally spaced apertures 61 therein to provide for this adjustment, it being understood that the bars 53 and 54 which diverge toward their rear ends may be brought closer together or spaced farther apart according to this adjustment of the links 59 with the brace 35 and that of the links 52 with the members 50. A plurality of plows 62 are shown mounted on the bars 53 and 54, any desired number of which may be employed, five being here shown mounted in each bar. These plows are removably mounted on said bars to provide for varying the number thereof according to the work to be done, for instance, any one of the plows may be removed when desired and different forms substituted for those remaining, or they may all be changed as desired.

Guide bars 64 and 65 are carried by the bars 53 and 54 being connected therewith by links as 66 and 67 which are united to said bars by set screws 68 so that when the guide bars and plow carrying bars are adjusted in relation to each other, these set screws may be tightened to hold them in this position. These guide bars 64 and 65 have straps or keepers spaced longitudinally thereon as indicated at 69 through which the beams or shanks 70 of the plows 62 extend so that the shifting of the bars 53 and 54 will operate to change the position of the plows to bring them closer together or space them farther apart at the will of the operator. It is to be understood that while a conventional form of plow 62 is herein shown, that any desired form may be employed according to the work it is desired to do, said plows 62 being shown detachable for this purpose.

It will be obvious that when the bars 53 and 54 are moved outward away from each other that the plows carried thereby will be spaced farther apart and when they are swung toward each other they will be disposed closer together and this is accomplished through the agency of the links 52 and 59 above described.

Pedals 71 are shown mounted on the brace bars 35 on which the operator's feet are designed to rest and which enable him to exert pressure on either one or the other of said bars to assist in shifting the position of the plows during the turning of the machine, it being obvious that a slight pressure on one or the other of these pedals will compress the spring 38 or 39 and through the agency of the links 52 and 59 will operate to shift the bar with which the brace is connected in the manner above described.

A seat 72 is supported on the tongue T in the manner usual with implements of this character and is provided with a socket 73 at its rear for receiving an umbrella not shown, and which is held in adjusted position by means of a set screw 74.

From the above description it will be obvious that when it is desired to use this machine for cultivating or plowing with a plurality of hoes or plows, the parts will be positioned as shown in Figs. 1 and 3, but when it is desired to use it for plowing with a single plow such as a middle buster it is desirable that the two beams 55 and 56 be disposed in close proximity and the middle buster not shown, is secured to the rear end of these combined beams and the device operated in the usual manner. To accomplish this the links 52 and 59 are detached to permit the bars to be folded inward in close proximity to each other and the frame 3' is then collapsed or contracted until the beams 55 and 56 are arranged close together and when this is accomplished, the frame is fastened by inserting the bolts which connect the frame bars and the middle buster may be then applied to these combined beams 55 and 56.

When it is desired to use the machine as an insect catcher only, without employing the earth-working implements, or to throw these implements out of use during the transportation of the machine from one point to another, this may be done by raising the plows out of contact with the ground by means of hand levers as 75, two of which are used but one only will be described in detail. This lever is pivoted at one end to a brace bar 76 which connects the U-shaped frame bar 12 with the front bar 4. A connecting link or bar 77 is connected at one end with the lever 75 and at its other end with the plow beams 55, it being understood that a similar construction is arranged at the other side of the machine. This bar 77 is provided with a plurality of vertically spaced apertures 78 which are designed to receive a locking finger 79 controlled by a pedal 80. This finger 79 passes through a keeper 81 in which said bar 77 is slidably mounted so that the bar 77 may be locked in adjusted position and thereby position the plows 62 at any desired point to provide for removing the plows from the ground or to adapt them for shallow or deep plowing at the will of the user. This finger 79 is spring actuated so that when pressure on the pedal 80 is released the spring shown at 82 will operate to force the finger inwardly into locking engagement with the bar 77.

It will thus be seen that when the lever 75 is depressed after having first disengaged the finger 79 therefrom, the beam 55 or 56 with which it is connected will be moved on its fulcrum so that the plow carrying end thereof will be correspondingly raised and vice versa when the lever 75 is raised, the plows carried at the other end of the beam will be correspondingly lowered.

It is to be understood that while the plow carrying bars 53 and 54 are shown with their rear ends diverging, they may be reversed in position to dispose their rear ends inward with their front ends diverging in substantially V-form. To accomplish this, the links 59 are disengaged from the braces 35 and the links 52 from the members 50 and said links 59 are connected with apertures in the side members of the frame.

By so constructing and mounting these plow bars, the adjustment thereof may be varied indefinitely, those shown and described being only a few of which the machine is capable.

The vertical adjustment of the frame adapts the machine for use in cultivating plants of different heights, since this adjustment provides for the raising and lowering of the entire structure except the axle and the wheels, which latter always retain their same position relative to the ground and serve as a support for the frame which carries the tongue, plows and other parts.

While this machine has been described for use in connection especially with cotton cultivation, it is to be understood that it may be used in cultivating and bugging various other plants, such as potatoes, corn and the like. It is further to be understood that the parts of the machine are constructed of any suitable or desired material.

From the foregoing description, taken in connection with the accompanying drawing, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:

1. In an insect gathering machine, a wheel supported structure comprising two sections adjustable laterally relative to each other, a fan carried by each of said sections, casings encompassing said fans, insect retaining chambers disposed below said casings, a tube of foraminous material connecting said fan and casings with said chambers at the rear of said casings, conduits leading from the front of said casings and converging toward their free ends, said conduits being extended downwardly, and insect collecting feet carried by the lower ends of said conduits and adjustably and flexibly connected therewith.

2. In an insect gathering machine, a wheel supported structure, fan casings mounted on said structure and spaced laterally apart, fans mounted in said casings and connected to be rotated by the movement of the machine over the surface which it traverses, conduits leading from said casings and inclined downwardly and forwardly and converging toward each other, substantially rectangular hollow insect collecting devices carried by the lower ends of said conduits with flexible members arranged between them to provide for the conformity of said collectors to any unevenness in the rows or to any obstructing objects which may lie in their path so that their path of movement will not be obstructed.

3. In an insect gathering machine, a wheel supported structure, fans carried by said structure, casings encompassing said fans, collecting chambers disposed below said casings, foraminous pipes connecting said casings with said chambers, and conduits leading from said casings at points opposite said pipe connections, said conduits being curved laterally inward and inclined downwardly with their free ends converging toward each other and provided with hollow collecting feet adapted to extend over a comparatively large area and to suck up the insects from the surface over which they are passed and conduct them through said conduits to the fan casings.

4. In a machine of the class described, a wheel supported frame, fans carried by said frame and independently operated with the turning of the wheels thereof, casings encompassing said fans, conduits leading from the front of said casings, and extending forwardly and downwardly converging toward their free ends, collecting elements adjustably mounted in said conduits, insect retaining chambers arranged below said fan casings, foraminous pipes connected at one end with said casings and at their other ends with said chambers, and valves mounted at the junction of said fan casings and the foraminous pipes and constructed to open when the fans are in motion and to automatically close when they stop.

5. An insect catcher of the class described including insect collecting means in combination with a tongue arranged in advance thereof and having two longitudinally spaced guard supports in the form of bands secured midway their ends to the tongue with their free ends depending on opposite sides thereof, and a fabric strip secured to and spanning the space between said supports, said strip being of a length sufficient to trail the ground on opposite sides of the tongue.

6. An insect catcher of the class described including a wheel supported structure having a tongue connected therewith, a frame depending from said tongue, a roller revolubly and adjustably mounted in said frame to adapt the roller to be positioned at varying heights for engaging plants of different sizes, and a guard carried by said tongue and housing said roller, said guard being open at its opposite ends longitudinally of the tongue and extending on its sides to the ground.

In testimony whereof I affix my signature in presence of two witnesses.

WILLIAM A. MILLER.

Witnesses:
M. E. JONES,
M. A. O'CONNOR.

Copies of this patent may be obtained for five cents each, by addressing the "Commissioner of Patents, Washington, D. C."